United States Patent
Tsai et al.

(10) Patent No.: US 9,996,755 B2
(45) Date of Patent: Jun. 12, 2018

(54) METHOD AND IMAGE PROCESSING APPARATUS FOR IMAGE-BASED OBJECT FEATURE DESCRIPTION

(71) Applicants: Chi-Yi Tsai, New Taipei (TW); Hsien-Chen Liao, New Taipei (TW)

(72) Inventors: Chi-Yi Tsai, New Taipei (TW); Hsien-Chen Liao, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 55 days.

(21) Appl. No.: 15/390,751

(22) Filed: Dec. 27, 2016

(65) Prior Publication Data
US 2018/0025239 A1  Jan. 25, 2018

(30) Foreign Application Priority Data
Jul. 19, 2016  (TW) .............................. 105122791 A

(51) Int. Cl.
*G06K 9/00* (2006.01)
*G06K 9/46* (2006.01)
(Continued)

(52) U.S. Cl.
CPC ........... *G06K 9/00818* (2013.01); *G06K 9/42* (2013.01); *G06K 9/4604* (2013.01); *G06K 9/481* (2013.01);
(Continued)

(58) Field of Classification Search
None
See application file for complete search history.

(56) References Cited

U.S. PATENT DOCUMENTS

| 9,418,429 | B2 * | 8/2016 | Kim ..................... G06T 7/0044 |
| 2007/0022329 | A1 * | 1/2007 | Adamek ........... G06F 17/30259 714/701 |

(Continued)

OTHER PUBLICATIONS

Navneet Dalal, et al., "Histograms of Oriented Gradients for Human Detection," Proceedings of the 2005 IEEE Computer Society Conference on Computer Vision and Pattern Recognition (CVPR'05), vol. 1, Jun. 20-26, 2005, pp. 886-893.
(Continued)

*Primary Examiner* — Nancy Bitar
(74) *Attorney, Agent, or Firm* — JCIPRNET

(57) ABSTRACT

A method and an image processing apparatus for image-based object feature description are provided. In the method, an object of interest in an input image is detected and a centroid and a direction angle of the object of interest are calculated. Next, a contour of the object of interest is recognized and a distance and a relative angle of each pixel on the contour to the centroid are calculated, in which the relative angle of each pixel is calibrated by using the direction angle. Then, a 360-degree range centered on the centroid is equally divided into multiple angle intervals and the pixels on the contour are separated into multiple groups according to a range covered by each angle interval. Afterwards, a maximum among the distances of the pixels in each group is obtained and used as a feature value of the group. Finally, the feature values of the groups are normalized and collected to form a feature vector that serves as a feature descriptor of the object of interest.

15 Claims, 6 Drawing Sheets

(51) Int. Cl.
| | |
|---|---|
| G06K 9/48 | (2006.01) |
| G06K 9/42 | (2006.01) |
| G06K 9/52 | (2006.01) |
| G06T 7/90 | (2017.01) |
| G06K 9/62 | (2006.01) |
| G06T 7/136 | (2017.01) |
| G06T 7/13 | (2017.01) |
| G06K 9/78 | (2006.01) |

(52) U.S. Cl.
CPC .......... *G06K 9/525* (2013.01); *G06K 9/6272* (2013.01); *G06K 9/78* (2013.01); *G06T 7/13* (2017.01); *G06T 7/136* (2017.01); *G06T 7/90* (2017.01); *G06T 2207/10024* (2013.01); *G06T 2207/30256* (2013.01)

(56) References Cited

U.S. PATENT DOCUMENTS

| | | | | |
|---|---|---|---|---|
| 2007/0223815 | A1* | 9/2007 | Makram-Ebeid | ........ G06K 9/34 382/173 |
| 2010/0054607 | A1* | 3/2010 | Aono | ...................... G06T 19/00 382/203 |

OTHER PUBLICATIONS

David G. Lowe, "Distinctive Image Features from Scale-Invariant Keypoints," International Journal of Computer Vision archive, vol. 60, Issue 2, Nov. 2004, pp. 91-110.

Herbert Bay, et al., "Speeded-Up Robust Features (SURF)," Computer Vision and Image Understanding, vol. 110, Issue 3, Jun. 2008, pp. 346-359.

J. Macqueen, "Some Methods for Classification and Analysis of Multivariate Observations," Proceedings of 5th Berkeley Symposium on Mathematical Statistics and Probability, vol. 1, 1967, pp. 281-297, retrieved on Dec. 23, 2016.

T. M. Cover, et al., "Nearest Neighbor Pattern Classification," IEEE Transactions on Information Theory, vol. IT-13, No. 1, Jan. 1967, pp. 21-27.

Corinna Cortes, et al., "Support-Vector Networks," Machine Learning, vol. 20, Issue 3, Sep. 1995, pp. 273-297.

Jack Greenhalgh, et al., "Real-Time Detection and Recognition of Road Traffic Signs," IEEE Transactions on Intelligent Transportation Systems, vol. 13, No. 4, Dec. 2012, pp. 1498-1506.

N. Bartneck, et al., "Colour Segmentation with Polynomial Classification," Proceedings., 11th IAPR International Conference on Pattern Recognition, 1992. vol. II. Conference B: Pattern Recognition Methodology and Systems, Aug. 30-Sep. 3, 1992, pp. 635-638.

Khairul Anuar Ishak, et al., "A Speed limit Sign Recognition System Using Artificial Neural Network," 4th Student Conference on Research and Development (SCOReD 2006), Jun. 27-28, 2006, pp. 127-131.

Yasser Baleghi Damavandi, et al., "Speed Limit Traffic Sign Detection & Recognition," Proceedings of the 2004 IEEE Conference on Cybernetics and Intelligent Systems, Dec. 1-3, 2004, pp. 797-802.

Miguel Ángel García-Garrido, et al., "Fast Road Sign Detection Using Hough Transform for Assisted Driving of Road Vehicles," Proceedings of 10th International Conference on Computer Aided Systems Theory, Feb. 7-11, 2005, pp. 543-548.

Jim Torresen, et al., "Efficient Recognition of Speed Limit Signs," Proceedings. The 7th International IEEE Conference on Intelligent Transportation Systems, Oct. 3-6, 2004, pp. 652-656.

Wei Liu, et al., "Real-Time Speed Limit Sign Detection and Recognition from Image Sequences," 2010 International Conference on Artificial Intelligence and Computational Intelligence (AICI), Oct. 23-24, 2010, pp. 262-267.

Asif Iqbal, et al., "A Novel Algorithm for Translation, Rotation and Scale Invariant Character Recognition," Proceedings of SCIS & ISIS 2008, Sep. 17, 2008, pp. 1367-1372.

Richard J. Prokop, et al., "A Survey of Moment-Based Techniques for Unoccluded Object Representation and Recognition," CVGIP: Graphical Models and Image Processing, vol. 54, Issue 5, Sep. 1992, pp. 438-460.

Mustapha Oujaoura, et al., "Zernike moments and neural networks for recognition of isolated Arabic characters," International Journal of Computer Engineering Science (IJCES), vol. 2, Issue 3, Mar. 2012, pp. 17-25.

Chi-Yi Tsai, et al., "A Novel Translation, Rotation, and Scale-Invariant Shape Description Method for Real-Time Speed-Limit Sign Recognition," IEEE ICASI 2016, May 27-31, 2016, pp. 1-3.

* cited by examiner

METHOD AND IMAGE PROCESSING APPARATUS FOR IMAGE-BASED OBJECT FEATURE DESCRIPTION

CROSS-REFERENCE TO RELATED APPLICATION

This application claims the priority benefit of Taiwan application serial no. 105122791, filed on Jul. 19, 2016. The entirety of the above-mentioned patent application is hereby incorporated by reference herein and made a part of this specification.

BACKGROUND OF THE INVENTION

Field of the Invention

The invention relates to an image processing method and an image processing apparatus, and particularly relates to a method and an image processing apparatus for image-based object feature description.

Description of Related Art

Currently, image-based object feature describing methods can be divided into three categories. The first category uses the feature points of an object as centers and utilizes local neighboring gradient orientation information to generate a feature descriptor vector that is geometrically invariant, such as feature point describing methods like scale-invariant feature transform (SIFT) or speeded up robust features (SURF). The second category utilizes texture feature information of an object to perform statistics on local gradient information and generate a robust feature descriptor, such as the feature describing method of histogram of oriented gradients (HOG). The third category utilizes contour information of an object to generate a shape feature descriptor of the object, such as the Fourier descriptor or the distance-to-centre (DtC) descriptor.

However, all of the conventional methods share a feature in common; that is, they all use a high dimensional feature vector to perform feature description. For example, SIFT uses a 128-dimension feature vector to describe each feature point; SURF uses a 64-dimension feature vector; the HOG feature descriptor uses a feature vector of at least 400 dimensions to perform statistics on the histogram of gradients; and the DtC descriptor uses a 160-dimension feature vector to describe the shape features of an object. Using a high dimensional feature vector not only augments the system's quantity of computation, the system's need for memory also increases. Therefore, it is not easy to employ such methods in a system with limited resources.

On the other hand, the conventional feature describing methods are not 100% geometrically invariant. For example, in the case of the HOG feature descriptor, before statistics on the histogram of gradients is performed, the principal direction of the object must be determined first with the help of additional algorithms. In the case of the DtC descriptor, the direction angle of an object must be turned to the same direction of the reference image beforehand so that the corresponding feature descriptor can be generated afterwards. All these requirements add to the complexity of object recognition algorithms, and in turn increase the system cost and reduce the practicality of the methods.

SUMMARY OF THE INVENTION

The invention provides a method and an apparatus for low dimensional image-based object feature description, capable of, within a limited angle range, providing a feature descriptor that is translation invariant, scale invariant, and rotation invariant.

The method for image-based object feature description of the invention is adapted for an electronic apparatus to describe an object feature in an input image. In this method, an object of interest in an input image is detected, and a centroid and a direction angle of the object of interest are calculated. Next, a contour of the object of interest is recognized, and a distance and a relative angle of each pixel on the contour to the centroid are calculated, in which the relative angle of each pixel is calibrated by using the direction angle. Then, a 360-degree range centered on the centroid is equally divided into a plurality of angle intervals, and the pixels on the contour are separated into a plurality of groups according to a range covered by each angle interval. Afterwards, a maximum among the distances of the pixels in each group is obtained as a feature value of the group. Finally, the feature values of the groups are normalized and collected to form a feature vector that serves as a feature descriptor of the object of interest.

In an embodiment of the invention, the aforesaid step of calculating the centroid and the direction angle of the object of interest includes binarizing an image of the object of interest to generate a binarized image, calculating a plurality of lower order moments of the binarized image so as to calculate the centroid of the object of interest by using the lower order moments, calculating a plurality of central moments relative to the centroid of the object of interest by using the centroid, and then calculating the direction angle of the object of interest by using the central moments.

In an embodiment of the invention, the aforesaid step of recognizing the contour of the object of interest includes searching for a plurality of neighboring pixels surrounding each of a plurality of pixels in the binarized image, determining if pixel values of the neighboring pixels are zero, and then determining that the pixel is located at the contour of the object of interest if the pixel value of one of the neighboring pixels is zero.

In an embodiment of the invention, the aforesaid step of calibrating the relative angle of each calculated pixel by the direction angle includes subtracting the direction angle from the relative angle of each pixel.

In an embodiment of the invention, the aforesaid step of normalizing the feature values of the groups includes dividing each of the feature values by a maximum among the feature values.

In an embodiment of the invention, the input image is a road image, and the aforesaid detecting the object of interest in the input image includes detecting a traffic sign in the road image to serve as the object of interest. Specifically, this detection includes converting a color space of the road image into a HSV (Hue, Saturation, Value) color space, performing a color thresholding algorithm on the road image of the HSV color space to generate a binarized mask of the road image, wherein the binarized mask indicates a region in the road image that belongs to a particular color, performing a contour detection algorithm on the binarized mask to obtain a contour of the region of the particular color, and finally detecting within the contour a region that meets a predetermined size (and a predetermined aspect ratio) as the object of interest.

In an embodiment of the invention, the aforesaid step of detecting the traffic sign in the road image to serve as the object of interest further includes binarizing an image of the object of interest to generate a binarized image, and extracting connected components in the binarized image to serve as a content of the object of interest by applying a connected component analysis, so as to calculate the centroid and the direction angle of the object of interest thereby.

The image processing apparatus of the invention includes a storage device and a processor. The storage device is configured to store a plurality of modules, and the processor is coupled to the storage device and configured to load and execute the modules in the storage device. The modules include an object detection module, a contour recognition module, a direction calibration module, and a feature description module. The object detection module is configured to detect an object of interest in an input image and calculate a centroid and a direction angle of the object of interest. The contour recognition module is configured to recognize a contour of the object of interest and calculate a distance and a relative angle of each pixel on the contour to the centroid. The direction calibration module is configured to calibrate the relative angle of each of the calculated pixels by using the direction angle. The feature description module is configured to divide a 360-degree range centered on the centroid equally into a plurality of angle intervals, separate the pixels on the contour into a plurality of groups according to a range covered by each angle interval, obtain a maximum among the distances of the pixels in each group to serve as a feature value of the group, and normalize and collect the feature values of the groups to form a feature vector that serves as a feature descriptor of the object of interest.

In an embodiment of the invention, the aforesaid image processing apparatus further includes an image capturing device that is coupled to the processor and configured to capture the input image.

In an embodiment of the invention, the aforesaid object detection module includes binarizing an image of the object of interest to generate a binarized image, calculating a plurality of lower order moments of the binarized image so as to calculate the centroid of the object of interest, and calculating a plurality of central moments relative to the centroid of the object of interest by using the centroid, so as to calculate the direction angle of the object of interest.

In an embodiment of the invention, the aforesaid contour recognition module includes searching for a plurality of neighboring pixels surrounding each of a plurality of pixels in the binarized image, determining if pixel values of the neighboring pixels are zero, and determining that the pixel is located at the contour of the object of interest if the pixel value of one of the neighboring pixels is zero.

In an embodiment of the invention, the aforesaid direction calibration module includes subtracting the direction angle from the relative angle of each pixel so as to calibrate the relative angle.

In an embodiment of the invention, the aforesaid feature description module includes dividing each of the feature values by a maximum among the feature values so as to normalize the feature values of the groups.

In an embodiment of the invention, the input image is a road image, and the aforesaid object detection module includes detecting a traffic sign in the road image to serve as the object of interest.

In an embodiment of the invention, the aforesaid object detection module includes converting a color space of the road image into a HSV color space, performing a color thresholding algorithm on the road image of the HSV color space to generate a binarized mask of the road image, wherein the binarized mask indicates a region in the road image that belongs to a particular color, performing a contour detection algorithm on the binarized mask to obtain a contour of the region of the particular color, and detecting within the contour a region that meets a predetermined size to serve as the object of interest.

In an embodiment of the invention, the aforesaid object detection module further includes binarizing an image of the object of interest to generate a binarized image, and extracting connected components in the binarized image to serve as a content of the object of interest by applying a connected component analysis, so as to calculate the centroid and the direction angle of the object of interest thereby.

Based on the above, in the invention, the image-based object feature describing method and the image processing apparatus use the moments in physics to represent the shape of an object of interest in an image and accordingly calculate its centroid and direction angle. Then, a contour of the object of interest is recognized, and a distance and a relative angle of each pixel on the contour to the centroid are calculated. A histogram that represents the relative angles and the distances is generated, in which the angle range is divided into a plurality of intervals in order to extract the feature value from each interval. Finally, a feature vector that is formed by the extracted feature values is normalized to serve as a feature descriptor of the object of interest. Within a limited angle range, this feature descriptor has the features of translation invariance, scale invariance, and rotation invariance.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
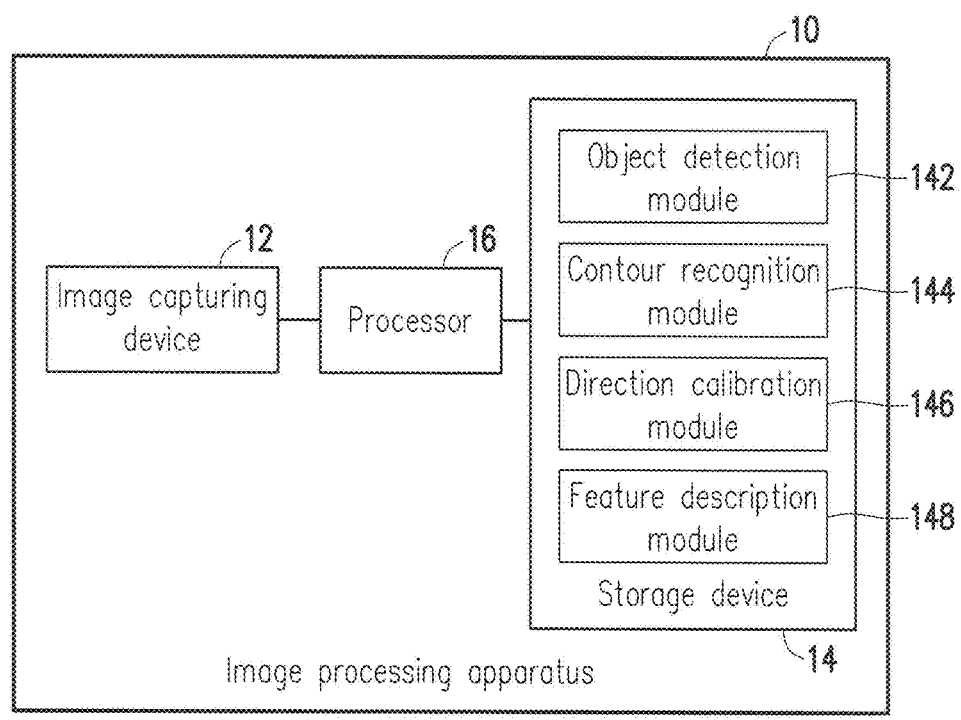
FIG. 1 is a block diagram of an image processing apparatus according to an embodiment of the invention.

The invention provides a method of feature description, which combines a feature calculating method that calculates distances and angles from a contour to a centroid, for providing feature descriptors that are translation invariant, scale invariant, and rotation invariant within a limited angle range to serve as training data for a support vector machine (SVM) classifier. Through the establishment of a large amount of databases, the classifying capability of the SVM is enhanced, and the well-trained classifier may then be transplanted to an embedded platform. Through the low dimensional feature describing method provided by the invention, the embedded platform, even with limited performance effectiveness, is still capable of detecting and recognizing an object in an image instantaneously.

In the invention, a moment in physics is used to represent the shape of an object. For a 2-D function ρ(x,y) in the real number field, the moment of order (p+q), denoted as $m_{pq}$, is defined to represent the density thereof, as expressed by formula (1) below:

$$m_{pq} = \int_{-\infty}^{\infty}\int_{-\infty}^{\infty} x^p y^q \rho(x, y) dx dy, \text{ for } p, q = 0, 1, 2, \ldots \quad (1)$$

If nonzero values are present in the plane of an image, a moment set of uniqueness $\{m_{pq}\}$ is then calculated. In other words, a moment set of uniqueness corresponds to a unique image, and after discretization the set is applied to the description of image-based objects. Here, a calculation formula for lower order moments is expressed by formula (2) below:

$$M_{pq} = \sum_x \sum_y x^p y^q I(x, y), \text{ for } p, q = 0, 1, 2, \ldots \quad (2)$$

Here, I(x,y) denotes a binarized or grayscale image-based object while p and q represent the order of an image moment. After a zeroth order moment $M_{00}$ and first order moments $M_{10}$ and $M_{01}$ are calculated, a centroid $(\bar{x}, \bar{y})$ of the image is found via formula (3) below:

$$\bar{x} = \frac{M_{10}}{M_{00}}, \bar{y} = \frac{M_{01}}{M_{00}} \quad (3)$$

After the image's centroid $(\bar{x}, \bar{y})$ is attained, a central moment $\mu_{pq}$ relative to the image's centroid $(\bar{x}, \bar{y})$ is inferred therefrom, and the central moment $\mu_{pq}$ is defined by formula (4) below:

$$\mu_{pq} = \sum_x \sum_y (x-\bar{x})^p (y-\bar{y})^q I(x, y), \text{ for } p, q = 0, 1, 2, \ldots \quad (4)$$

The central moment $\mu_{pq}$ has the feature of translation invariance. After a first order central moment $\mu_{11}$ and second order central moments $\mu_{20}$ and $\mu_{02}$ are calculated, they are used to calculate a direction angle θ of the image-based object, as expressed by formula (5) below:

$$\mu_{11} = M_{11} - \bar{x}M_{01}, \mu_{20} = M_{20} - \bar{x}M_{10}, \mu_{02} = M_{02} - \bar{y}M_{01}, \quad (5)$$
$$\theta = \frac{1}{2}\arctan\left(\frac{2\mu_{11}}{\mu_{20}-\mu_{02}}\right), \mu_{20} - \mu_{02} \neq 0$$

Here, the range of the direction angle θ of the image is limited as |θ|<45°.

In the following, some of the embodiments of the invention are described in detail with reference to the accompanying drawings. In regard to the reference numerals cited in the below description, whenever the same reference numerals are used in different drawings, the reference numerals are viewed as indicating identical or similar components. These embodiments are only part of the invention and do not disclose every possible manner of practicing the invention. More specifically, these embodiments serve only as examples of the apparatus and method recited in the claims of the invention.

FIG. 1 is a block diagram of an image processing apparatus according to an embodiment of the invention. An image processing apparatus 10 in this embodiment is, for example, a calculating device such as a desktop computer, a laptop computer, a workstation or a server equipped with calculating functions, or a stationary or portable electronic device such as a mobile phone, a tablet, a digital camera, a digital video camera, a webcam, an event data recorder (EDR), a navigation device or an in-vehicle computer, but the invention is not limited thereto. The image processing apparatus 10 at least includes an image capturing device 12, a storage device 14, and a processor 16, the functions of which are respectively described as follows:

The image capturing device 12 is, for example, a camera that includes an optical lens and a photosensitive element such as a charge-coupled device (CCD) or a complementary metal-oxide semiconductor (CMOS), for capturing images. In other embodiments, the image capturing device 12 may also be a card reader for retrieving images from a memory card, or a wired or wireless networking card or another communication device for retrieving images from network equipment, but the invention is not limited thereto.

The storage device 14 is, for example, any type of stationary or portable random access memory (RAM), read-only memory (ROM), flash memory or a similar component, or a combination of the aforesaid components. In this embodiment, the storage device 14 records an object detection module 142, a contour recognition module 144, a direction calibration module 146, and a feature description module 148.

The processor 16 is, for example, a central processing unit (CPU), or a programmable device for general or special use such as a microprocessor, a digital signal processor (DSP), a programmable controller, an application specific integrated circuit (ASIC), a programmable logic device (PLD) or another similar device, or a combination of the aforesaid devices. The processor 16 is connected to the image capturing device 12 and the storage device 14.

In this embodiment, the modules recorded in the storage device 14 are, for example, computer programs, which are loaded by the processor 16 to implement the image-based object feature describing method of this embodiment. Embodiments are now provided as follows to explicate the steps of this method in detail.

Figure 2:
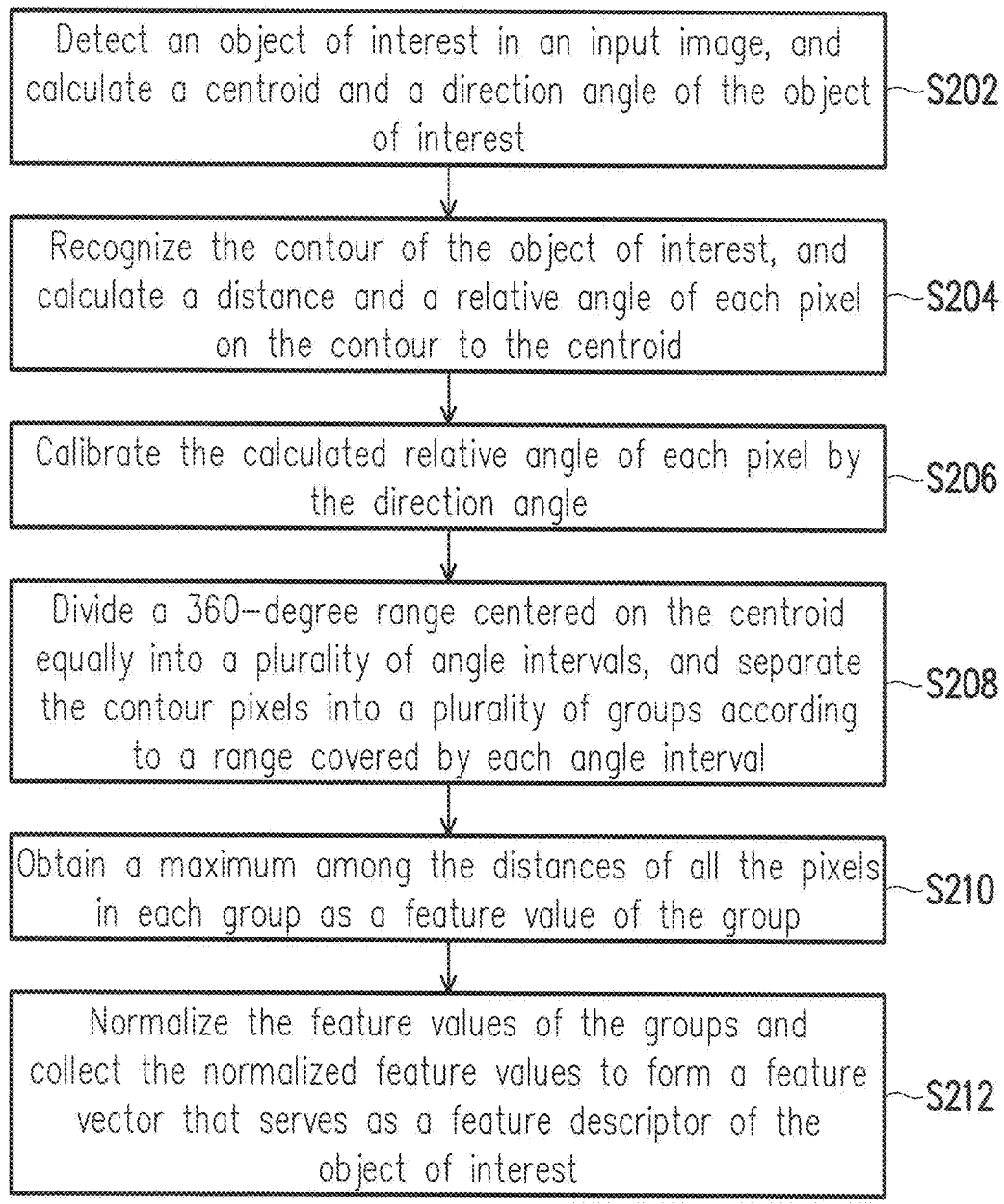
FIG. 2 is a flowchart of an image-based object feature describing method according to an embodiment of the invention.

FIG. 2 is a flowchart of the image-based object feature describing method according to an embodiment of the invention. Referring to FIG. 1 and FIG. 2 simultaneously, the method of this embodiment is adapted for the image processing apparatus 10 in FIG. 1. With reference to the devices of the image processing apparatus 10 in FIG. 1, the steps of the image-based object feature describing method in this embodiment are now described in detail as follows:

First, the processor 16 executes the object detection module 142 to detect an object of interest in an input image, and calculates a centroid and a direction angle of the object of interest (step S202). The input image is, for example, an image captured by the image capturing device 12, or an image retrieved from other devices or network equipment, but the invention is not limited thereto.

It should be noted that in this embodiment, regarding the object of interest or a region of interest (ROI) in the image, the formula for lower order moments is used to calculate the centroid, and the formula for central moments is used to calculate the direction angle.

Specifically, the processor 16, for example, in executing the object detection module 142, first performs binarization on an image of the object of interest to generate a binarized image, and then calculates the lower order moments of the binarized image and uses the same to calculate the centroid of the object of interest. Then, the processor 16 calculates a plurality of central moments relative to the centroid of the object of interest by using the centroid and uses the same to calculate the direction angle of the object of interest.

For example, if I(x,y) stands for the binarized ROI image and p and q represent the order of a lower order moment, in this embodiment the aforesaid formula (2) is used to calculate a zeroth order moment $M_{00}$ and first order moments $M_{10}$ and $M_{01}$, and the aforesaid formula (3) is used to calculate the position $(\bar{x},\bar{y})$ of the centroid $P_c$ of ROI. The calculated centroid has the feature of translation invariance.

Once the centroid position $(\bar{x},\bar{y})$ of the binarized ROI is obtained, later when feature extraction is performed, the centroid position $(\bar{x},\bar{y})$ is used to calculate the distance from the object's contour to the centroid $P_c$. On the other hand, in this embodiment, the aforesaid formula (4) is also used to calculate a first order moment $\mu_{11}$ and second order moments $\mu_{20}$ and $\mu_{02}$ of the ROI image, and the aforesaid formula (5) is used to calculate a direction angle $\theta_c$ of ROI which indicates the tilting condition of ROI.

It should be noted that even if affine computation may be applied directly to make normalization adjustments with respect to translation, scaling and rotation by using the calculated centroid position $(\bar{x},\bar{y})$ and the calculated direction angle $\theta_c$ of ROI, in this embodiment normalization is not performed to ROI at this moment due to the reason of efficiency. Not until later when feature extraction is performed is compensation then applied to feature values, so as to increase the speed of computation.

Figure 3A:
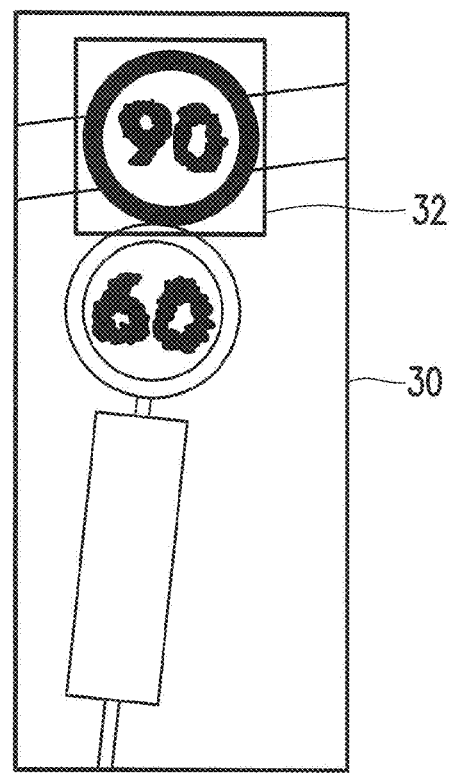
FIGS. 3A to 3C illustrate an example of detecting an object of interest in an image and calculating the centroid and the direction angle according to an embodiment of the invention.
Figure 3B:
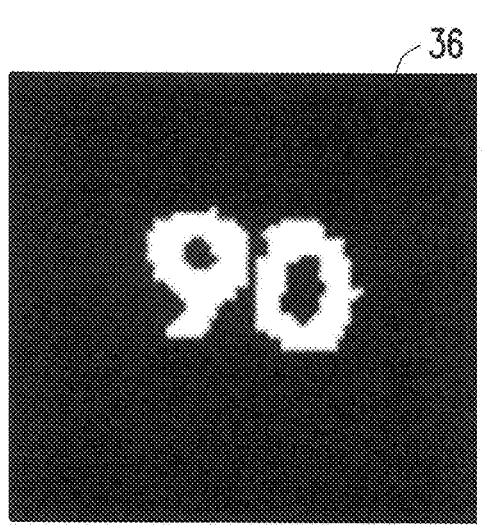
Figure 3C:
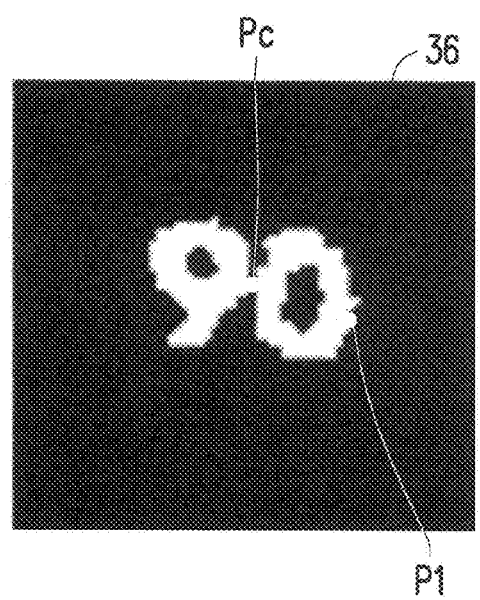

For example, FIGS. 3A to 3C illustrate an example of detecting an object of interest in an image and then calculating the centroid and the direction angle thereof according to an embodiment of the invention. For this embodiment, please refer to FIG. 3A, wherein the image processing apparatus is, for example, an in-vehicle computer that is connected to an EDR so as to process a road image 30 recorded by the EDR, thereby detecting a traffic sign (for example, a speed limit sign 32) in the road image 30 to serve as the object of interest.

Here, the image processing apparatus, for example, converts a color space of the road image 30 into a HSV (Hue, Saturation, Value) color space, and performs a color thresholding algorithm on the road image of the HSV color space to generate a binarized mask of the road image. The binarized mask is used to indicate a region in the road image that belongs to a particular color (such as the red region in the speed limit sign 32). Then, the image processing apparatus performs a contour detection algorithm on the binarized mask in order to obtain the contour of the region of the particular color. Afterwards, the image processing apparatus detects within the contour a region that meets a predetermined size (for example, 100 pixels) and/or a predetermined aspect ratio (for example, 0.8-1.25) as the object of interest. Thereby, the image processing apparatus recognizes the speed limit sign 32 in the road image 30.

In order to recognize the content of the speed limit sign 32 (i.e. a speed limit of 90), after detecting the speed limit sign 32, the image processing apparatus further performs binarization processing on the image of the speed limit sign 32 to generate a binarized image. Then, through a connected component analysis, connected components in the binarized image are extracted to serve as the content of the object of interest. Eventually, an image of speed limit 36 is obtained as shown in FIG. 3B.

Finally, in regard to the image of speed limit 36, the image capturing device uses the aforesaid formula for lower order moments to calculate the centroid (the centroid $P_c$ as shown in FIG. 3C) and uses the aforesaid formula for central moments to calculate the direction angle.

Referring back to the flow shown in FIG. 2, after the centroid and the direction angle of the ROI image are decided, the processor 16 then continues to execute the contour recognition module 144 so as to recognize the contour of the object of interest and calculate the distance and relative angle of each pixel on the contour to the centroid (step 204). In this embodiment, a four-direction detection method is used to search for pixels with a value of 1 in the binarized ROI image, and the determination is made based on the values of the neighboring pixels located on the four directions surrounding each searched pixel.

Specifically, the contour recognition module 144, for example, searches for a plurality of neighboring pixels surrounding each of a plurality of pixels in the aforesaid binarized ROI image (for example, the four neighboring pixels that are above, below, to the left, and to the right of the pixel), and determines if the pixel values of these neighboring pixels are zero. If the pixel value of one of the neighboring pixels is zero, the contour recognition module 144 then determines that this pixel is located at the contour of the object of interest. By repeating the aforesaid determination procedure, the contour recognition module 144 eventually completes recognizing the contour of the object of interest.

Figure 4A:
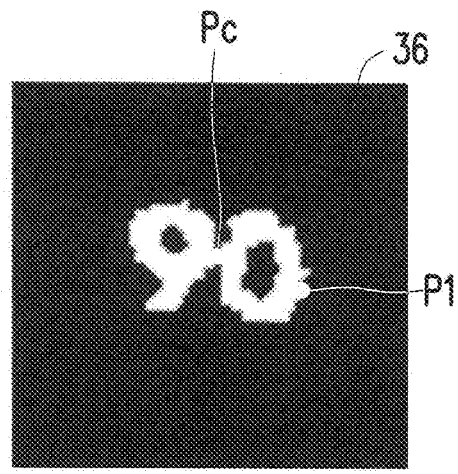
FIGS. 4A to 4C illustrate an example of recognizing the contour of an object of interest in an image according to an embodiment of the invention.
Figure 4B:
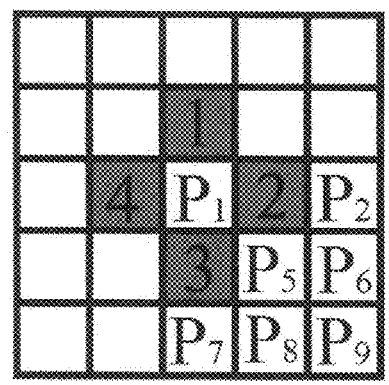
Figure 4C:
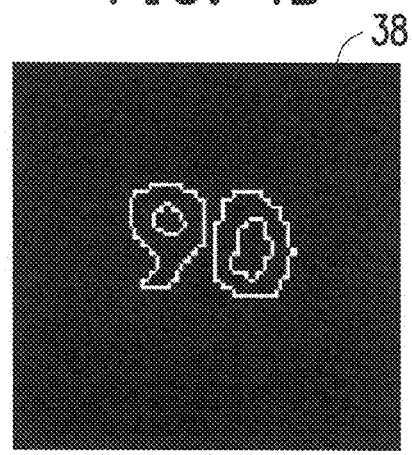

For example, FIGS. 4A to 4C illustrate an example of recognizing the contour of an object of interest in an image according to an embodiment of the invention. This embodiment follows on the embodiment shown in FIGS. 3A to 3C. Referring to FIG. 4A, contour recognition is performed on the image of speed limit 36. Referring to FIG. 4B, regarding any pixel (for example, the pixel $P_1$) with a value of 1 in the image of speed limit 36, the numbers 1, 2, 3 and 4 surrounding the pixel $P_1$ represent the four directions of the pixel $P_1$. In this embodiment, whether or not the pixel $P_1$ is located at the contour is decided by determining the values of the neighboring pixels on the four directions. If at least one of the neighboring pixels on the four directions has a value of zero, a determination is made that the pixel $P_1$ does belong to the pixels on the contour. By making the aforesaid determination one by one on all of the pixels with a value of 1 in the binarized ROI, finally all of the pixels on the contour of ROI are located, and a contour image of speed limit 38 is obtained as shown in FIG. 4C.

Figure 5A:
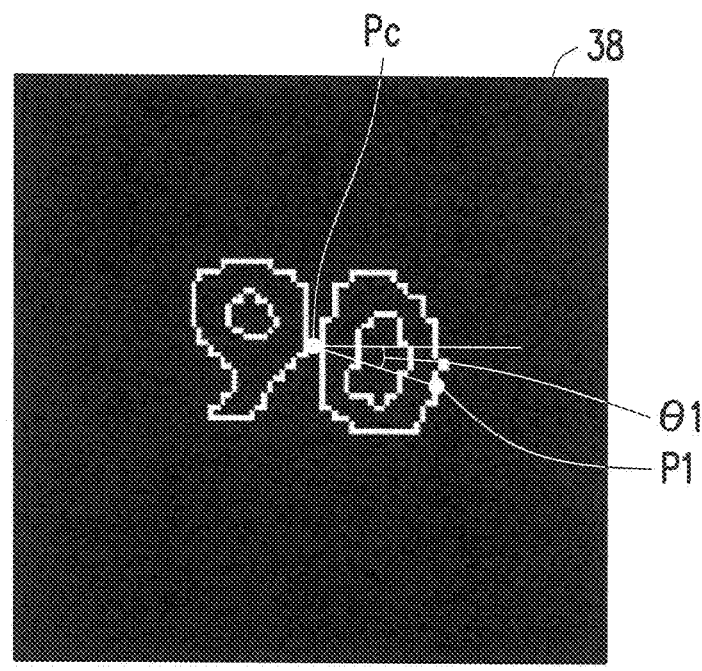
FIGS. 5A to 5C illustrate an example of describing an image-based object feature according to an embodiment of the invention.
Figure 5B:
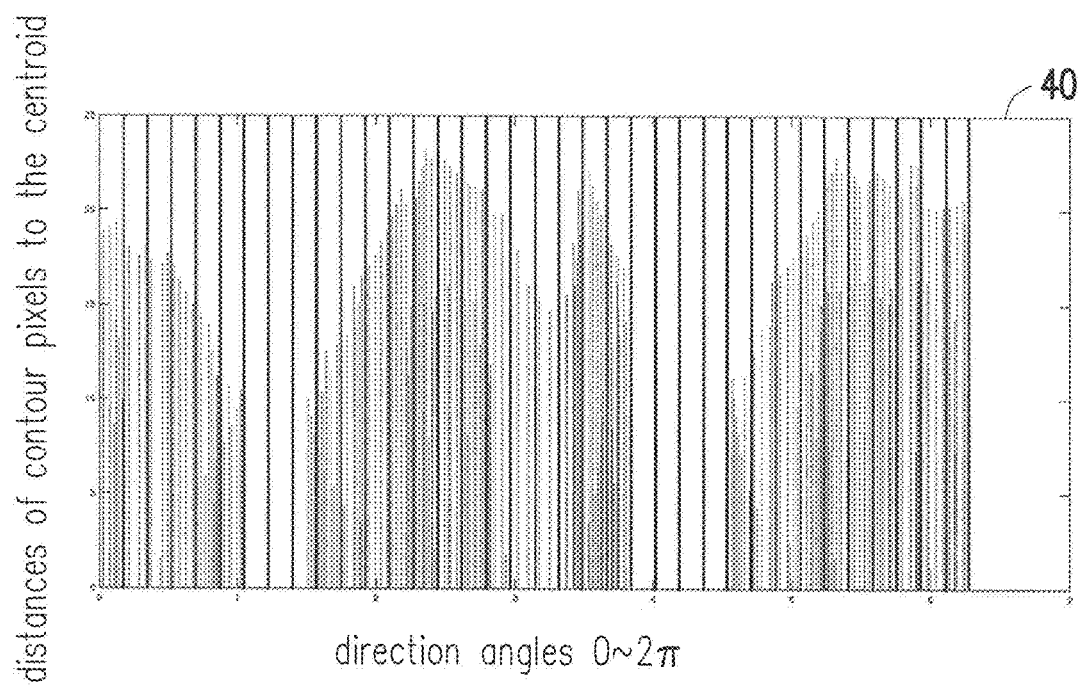
Figure 5C:
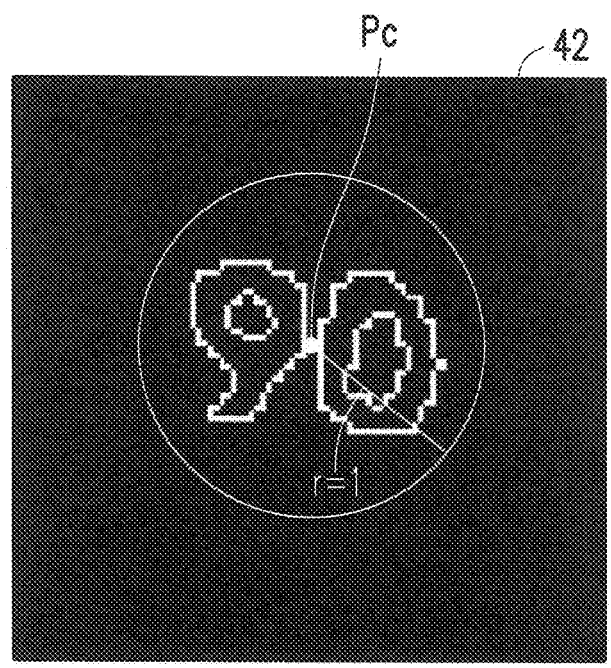

In this embodiment, after the contour pixels of ROI are located, a distance $\gamma$ and a relative angle $\theta$ of each contour pixel to the centroid are then calculated. For example, FIGS. 5A to 5C illustrate an example of describing an image-based object feature according to an embodiment of the invention. As shown in FIG. 5A, if the position of the centroid $P_c$ is ($\bar{x},\bar{y}$) and the position of the contour pixel $P_1$ is $(x_1,y_1)$, then a distance $\gamma_1$ and a relative angle $\theta_1$ of the pixel $P_1$ to the centroid $P_c$ are calculated according to a formula of trigonometric functions. This calculation formula is denoted as follows:

$$\gamma_1 = \sqrt{(x_1 - \bar{x})^2 + (y_1 - \bar{y})^2} \quad (7)$$

$$\theta_1 = \arctan\left(\frac{y_1 - \bar{y}}{x_1 - \bar{x}}\right) \quad (8)$$

After all of the contour pixels of ROI are searched, if the number of the contour pixels of ROI is n, then a set of the distances from the contour pixels to the centroid, denoted as $\{\gamma_1, \gamma_2, \gamma_3, \ldots, \gamma_n\}$, and a set of the relative angles of the contour pixels to the centroid, denoted as $\{\theta_1, \theta_2, \theta_3, \ldots, \theta_n\}$, are obtained to serve as feature sets for the ROI image.

Referring back to the flow in FIG. 2, after the distance and relative angle of each contour pixel to the centroid are obtained, the processor 16 then executes the direction calibration module 146 to calibrate the calculated relative angle of each pixel by using the direction angle previously calculated (the step S206).

Specifically, following the aforesaid example shown in FIGS. 5A to 5C, in this embodiment, concerning the possibly existing tilting condition of the ROI image, compensation or calibration is applied to the set $\{\theta_1, \theta_2, \theta_3, \ldots, \theta_n\}$, i.e. the set of the relative angles of the contour pixels to the centroid. That is, in this embodiment, the earlier calculated direction angle $\theta_c$ of the ROI is subtracted from each angle of the set $\{\theta_1, \theta_2, \theta_3, \ldots, \theta_n\}$, i.e. the set of the relative angles of the contour pixels to the centroid, and then a new set of relative angles, denoted as $\{\theta_1', \theta_2', \theta_3', \ldots, \theta_n'\}$ is obtained. This calculation equals calibrating all the relative angles of the contour pixels to the centroid as the ones using the direction angle $\theta_c$ of the ROI as the reference. Such calculation is more efficient than applying affine rotation to the ROI image beforehand.

The processor 16 then executes the feature description module 148 to equally divide a 360-degree range centered on the centroid into a plurality of angle intervals, and separate the contour pixels into a plurality of groups according to a range covered by each angle interval (step S208), then obtain a maximum among the distances of the pixels in each group as a feature value of the group (step S210), and finally normalize the feature values of the groups and collect the normalized feature values to form a feature vector that serves as a feature descriptor of the object of interest (step S212).

Specifically, following the aforesaid example shown in FIGS. 5A to 5C, in this embodiment, based on the aforesaid set of the distances from the contour pixels to the centroid and the new set of relative angles, each of the angles in the set of relative angles calculated for the contour image of speed limit 38 of FIG. 5A is arranged in the sequence from 0 to $2\pi$, and illustrated as a histogram 40 of the relative angles and the distances to the centroid, as shown in FIG. 5B. Here, the x-axis represents the relative angles and the y-axis represents the corresponding distances. Because the number of the contour pixels in each direction of ROI is not the same, in this embodiment, the angles $0\sim2\pi$ on the x-axis are divided equally into 36 angle intervals, and for each angle interval a feature value is determined, with 36 dimensions in total. In this embodiment, a maximum among the distances to the centroid in each angle interval is used as the feature value. After the feature values of 36 angle intervals are collected, the feature values of 36 dimensions are obtained to form a feature vector. Finally, the feature values of 36 dimensions of the feature vector are all divided by a maximum among the feature values of 36 dimensions so as to obtain a normalized feature vector. The result is like normalizing ROIs of different scales to be within a circle that has a radius $\gamma=1$ as shown by a contour image of speed limit 42 in FIG. 5C. After the above procedure of normalization is performed, finally a feature descriptor that is scale invariant is obtained.

In summary, in the image-based object feature describing method and the image processing apparatus of the invention, through combining the feature describing method for the distances and angles from the contour to the centroid, feature descriptors that are translation invariant, scale invariant, and rotation invariant can be provided within a limited angle range. After a large amount of such feature data are used to train the SVM classifier, the classifying and recognizing capabilities of the SVM are enhanced. In particular, since the feature describing method of the invention enhances the system performance in terms of the classification and recognition rate, it is not only applied to the classification and recognition of the aforesaid traffic sign but also can be extended to the description and recognition of the features of other objects. Furthermore, since the feature describing method of the invention only uses low dimensional feature values for describing the shape features of objects, this method is transplantable to an embedded platform and then enables the platform, even with limited performance effectiveness, to achieve the effect of detecting and recognizing an object in an image instantaneously.

Although the embodiments are already disclosed as above, these embodiments should not be construed as limitations on the scope of the invention. It will be apparent to those ordinarily skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A method for image-based object feature description, adapted for an electronic apparatus to describe an object feature in an input image, the method comprising:
   detecting an object of interest in the input image, and calculating a centroid and a direction angle of the object of interest;
   recognizing a contour of the object of interest, and calculating, among a plurality of pixels on the contour, a distance and a relative angle of each of the pixels to the centroid;
   calibrating the calculated relative angle of each of the pixels by using the direction angle;
   dividing a 360-degree range centered on the centroid equally into a plurality of angle intervals, and separating the pixels on the contour into a plurality of groups according to a range covered by each of the angle intervals;
   obtaining a maximum among the distances of the pixels in each of the groups as a feature value of the group; and
   normalizing and collecting the feature values of the groups to form a feature vector that serves as a feature descriptor of the object of interest.

2. The image-based object feature describing method according to claim 1, wherein the step of calculating the centroid and the direction angle of the object of interest comprises:
   binarizing an image of the object of interest to generate a binarized image;

calculating a plurality of lower order moments of the binarized image, comprising a zeroth order moment and a first order moment;

calculating the centroid of the object of interest by using the lower order moments;

calculating a plurality of central moments relative to the centroid of the object of interest by using the centroid, the central moments comprising a first order central moment and a second order central moment; and calculating the direction angle of the object of interest by using the central moments.

3. The image-based object feature describing method according to claim 2, wherein the step of recognizing the contour of the object of interest comprises:

searching for a plurality of neighboring pixels surrounding each of a plurality of pixels in the binarized image, and determining if pixel values of the neighboring pixels are zero; and determining that the pixel is located at the contour of the object of interest if the pixel value of one of the neighboring pixels is zero.

4. The image-based object feature describing method according to claim 1, wherein the step of calibrating the relative angle of each of the calculated pixels by the direction angle comprises:

subtracting the direction angle from the relative angle of each of the pixels.

5. The image-based object feature describing method according to claim 1, wherein the step of normalizing the feature values of the groups comprises:

dividing each of the feature values by a maximum among the feature values.

6. The image-based object feature describing method according to claim 1, wherein the input image is a road image, and the step of detecting the object of interest in the input image comprises:

detecting a traffic sign in the road image to serve as the object of interest, which comprises:

converting a color space of the road image into a HSV (Hue, Saturation, Value) color space;

performing a color thresholding algorithm on the road image of the HSV color space to generate a binarized mask of the road image, wherein the binarized mask indicates a region in the road image that belongs to a particular color;

performing a contour detection algorithm on the binarized mask to obtain a contour of the region of the particular color; and detecting within the contour a region that meets a predetermined size to serve as the object of interest.

7. The image-based object feature describing method according to claim 6, wherein the step of detecting the traffic sign in the road image to serve as the object of interest further comprises:

binarizing an image of the object of interest to generate a binarized image; and extracting connected components in the binarized image to serve as a content of the object of interest by applying a connected component analysis, so as to calculate the centroid and the direction angle of the object of interest.

8. An image processing apparatus, comprising:
a storage device, storing a plurality of modules; and
a processor, coupled to the storage device and configured to load and execute the modules in the storage device, the modules comprising:

an object detection module, detecting an object of interest in an input image and calculating a centroid and a direction angle of the object of interest;

a contour recognition module, recognizing a contour of the object of interest, and calculating, among a plurality of pixels on the contour, a distance and a relative angle of each of the pixels to the centroid;

a direction calibration module, calibrating the calculated relative angle of each of the pixels by using the direction angle; and a feature description module, dividing a 360-degree range centered on the centroid equally into a plurality of angle intervals, separating the pixels on the contour into a plurality of groups according to a range covered by each of the angle intervals, obtaining a maximum among the distances of the pixels in each of the groups to serve as a feature value of the group, and normalizing and collecting the feature values of the groups to form a feature vector that serves as a feature descriptor of the object of interest.

9. The image processing apparatus according to claim 8, further comprising:

an image capturing device, coupled to the processor and configured to capture the input image.

10. The image processing apparatus according to claim 8, wherein the object detection module comprises binarizing an image of the object of interest to generate a binarized image, calculating a plurality of lower order moments of the binarized image so as to calculate the centroid of the object of interest, and calculating a plurality of central moments relative to the centroid of the object of interest by using the centroid so as to calculate the direction angle of the object of interest.

11. The image processing apparatus according to claim 10, wherein the contour recognition module comprises searching for a plurality of neighboring pixels surrounding each of a plurality of pixels in the binarized image, determining if pixel values of the neighboring pixels are zero, and determining that the pixel is located at the contour of the object of interest if the pixel value of one of the neighboring pixels is zero.

12. The image processing apparatus according to claim 8, wherein the direction calibration module comprises subtracting the direction angle from the relative angle of each of the pixels so as to calibrate the relative angle.

13. The image processing apparatus according to claim 8, wherein the feature description module comprises dividing each of the feature values by a maximum among the feature values so as to normalize the feature values of the groups.

14. The image processing apparatus according to claim 8, wherein the input image is a road image, and the object detection module comprises detecting a traffic sign in the road image as the object of interest, which comprises: converting a color space of the road image into a HSV color space; performing a color thresholding algorithm on the road image of the HSV color space to generate a binarized mask of the road image, wherein the binarized mask indicates a region in the road image that belongs to a particular color; performing a contour detection algorithm on the binarized mask to obtain a contour of the region of the particular color; and detecting within the contour a region that meets a predetermined size to serve as the object of interest.

15. The image processing apparatus according to claim 14, wherein the object detection module further comprises binarizing an image of the object of interest to generate a binarized image, and extracting connected components in the binarized image to serve as a content of the object of interest by applying a connected component analysis, so as to calculate the centroid and the direction angle of the object of interest.

\* \* \* \* \*